United States Patent [19]

Custer et al.

[11] Patent Number: 5,215,380
[45] Date of Patent: Jun. 1, 1993

[54] RECLOSABLE PACKAGE WITH TEAR STRIP

[75] Inventors: Richard G. Custer; Richard R. Kosiorek, Appleton; Michael P. Kolosoo, Appleton; Mladomir Tomic, Appleton, all of Wis.

[73] Assignee: Reynolds Consumer Products, Inc., Appleton, Wis.

[21] Appl. No.: 947,081

[22] Filed: Sep. 18, 1992

Related U.S. Application Data

[60] Continuation of Ser. No. 870,984, Apr. 20, 1992, abandoned, which is a division of Ser. No. 741,807, Aug. 6, 1991, Pat. No. 5,127,208, which is a continuation-in-part of Ser. No. 600,756, Oct. 19, 1990, Pat. No. 5,046,300.

[51] Int. Cl.⁵ .................. B65D 33/25; B65D 33/34
[52] U.S. Cl. ........................................ 383/61; 383/63; 383/203; 383/206
[58] Field of Search ............... 383/61, 63, 203, 204, 383/205, 206, 207, 208, 209, 210

[56] References Cited

U.S. PATENT DOCUMENTS

| 3,780,781 | 12/1973 | Uramoto | 383/61 X |
| 4,354,541 | 10/1982 | Tilman | 383/63 |
| 4,428,788 | 1/1984 | Kamp | 383/63 X |
| 4,731,911 | 3/1988 | Gould | 383/63 X |
| 4,756,629 | 7/1988 | Tilman et al. | 383/63 |
| 4,817,188 | 3/1989 | Van Erden | 383/63 |
| 4,966,470 | 10/1990 | Thompson et al. | 383/63 X |
| 5,022,530 | 6/1991 | Zieke | 383/61 X |
| 5,036,643 | 8/1991 | Bodolay | 383/61 X |
| 5,077,064 | 12/1991 | Hustad et al. | 383/63 X |
| 5,100,246 | 3/1992 | La Pierre et al. | 383/204 |
| 5,116,140 | 5/1992 | Hirashima | 383/61 X |
| 5,121,997 | 6/1992 | La Pierre et al. | 383/63 X |

Primary Examiner—Allan N. Shoap
Assistant Examiner—Jes F. Pascua
Attorney, Agent, or Firm—Alan T. McDonald

[57] ABSTRACT

A method and an apparatus for applying a reclosable profile element and a tear strip element to a packaging film is disclosed. Packaging film is formed into a tubular form about a forming tube. The tubular shaped packaging film is advanced along the length of the forming tube and over a product fill tube having an outer perimeter less than the outer perimeter of the forming tube. The packaging film is deformed to conform to the outer perimeter of the product fill tube. Excess packaging film, made available due to the differences in outer perimeters of the forming tube and product fill tube, is formed into a loop. A reclosable profile element is guided into the loop and adhered to the inner surface of the loop. A tear strip is also provided which may be adhered to the packaging film prior to said film into a tubular shape about said forming tube, or may be guided into the loop of said film.

2 Claims, 11 Drawing Sheets

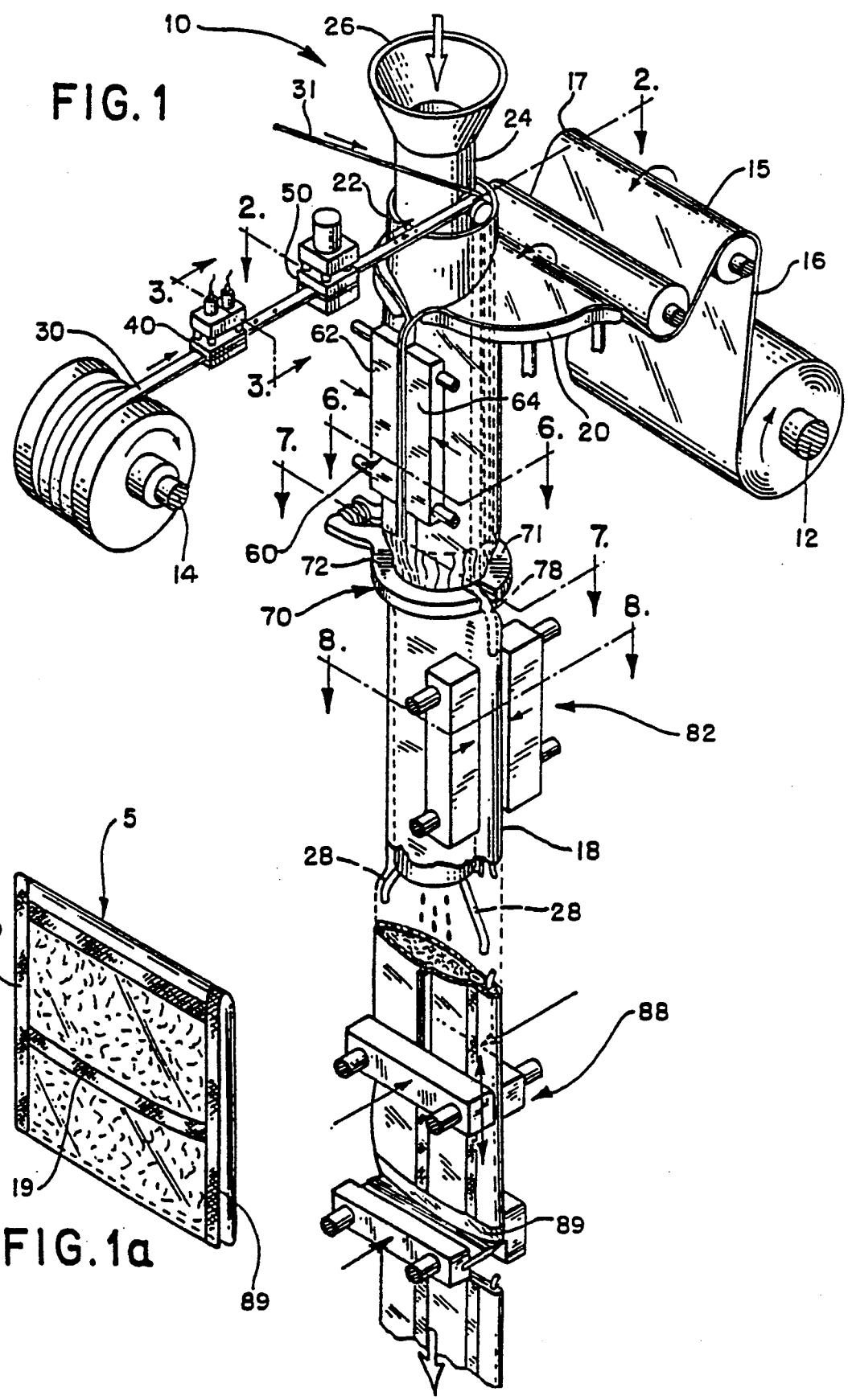

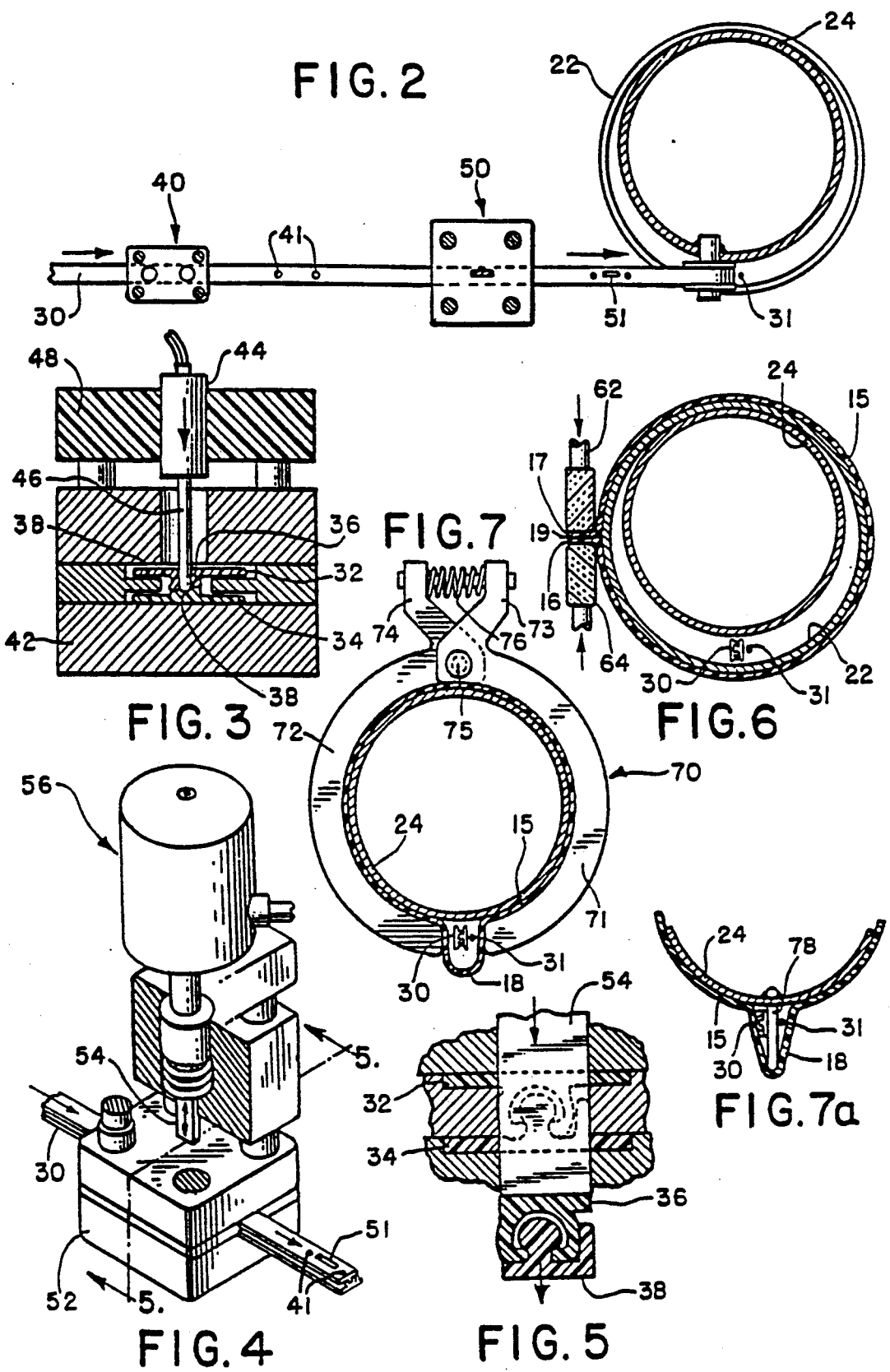

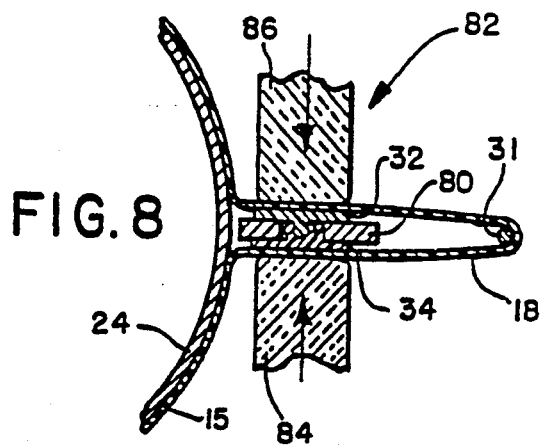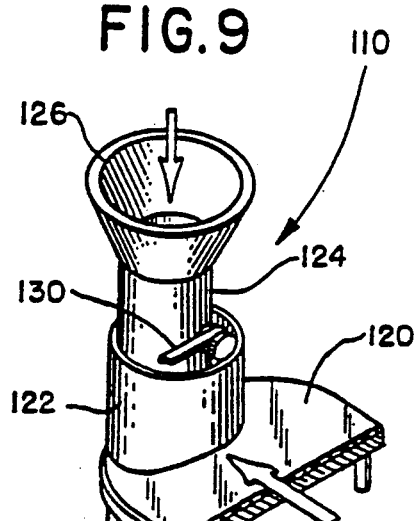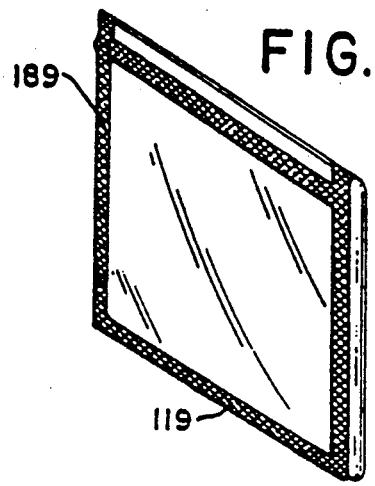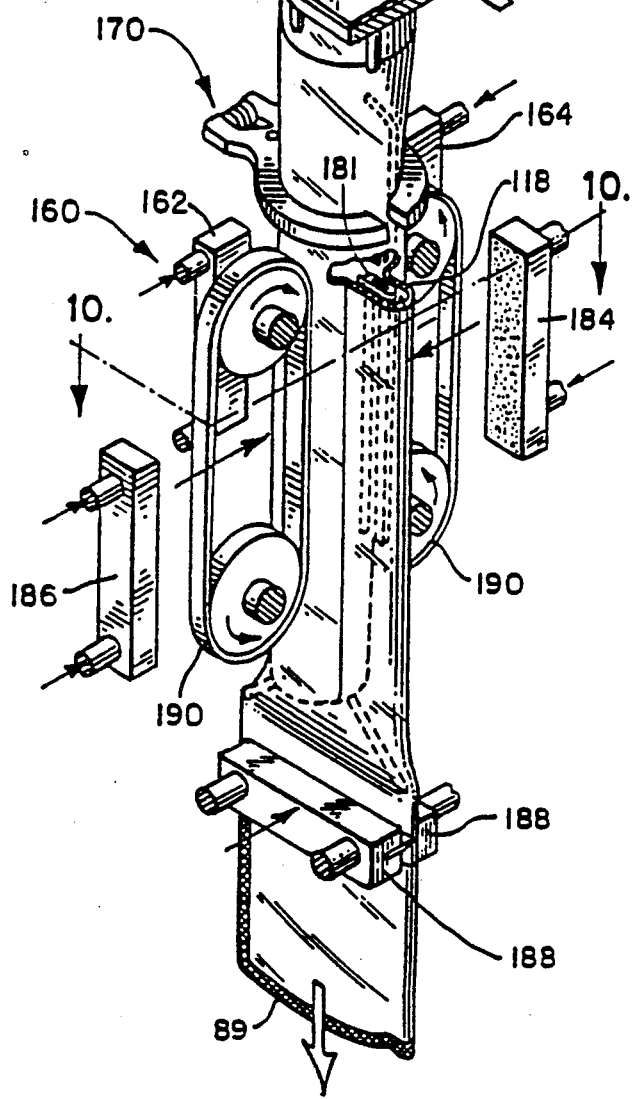

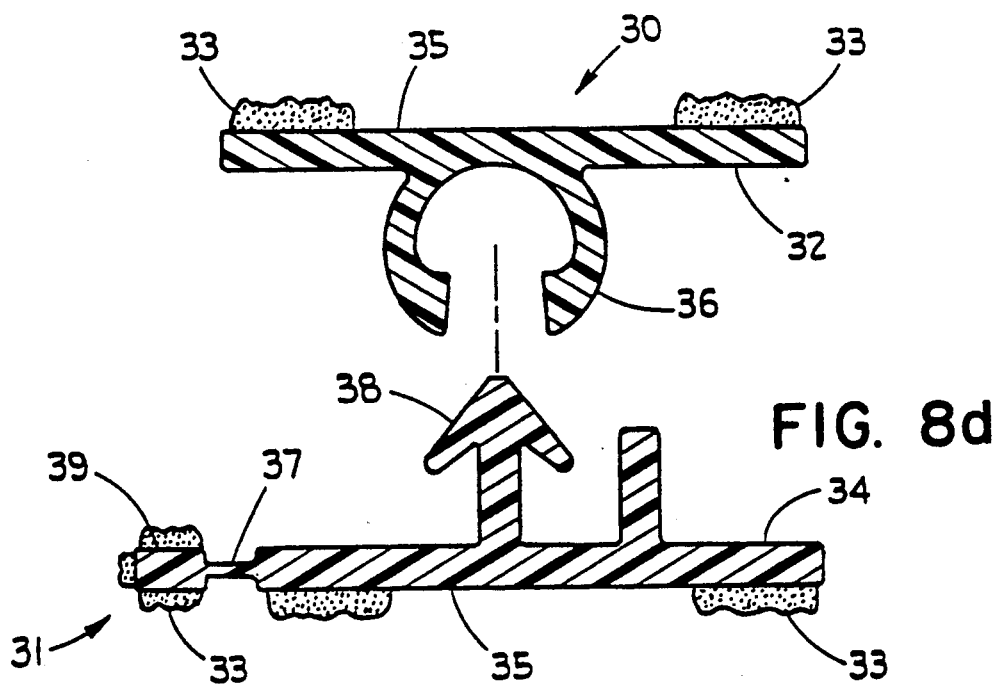
FIG. 8d
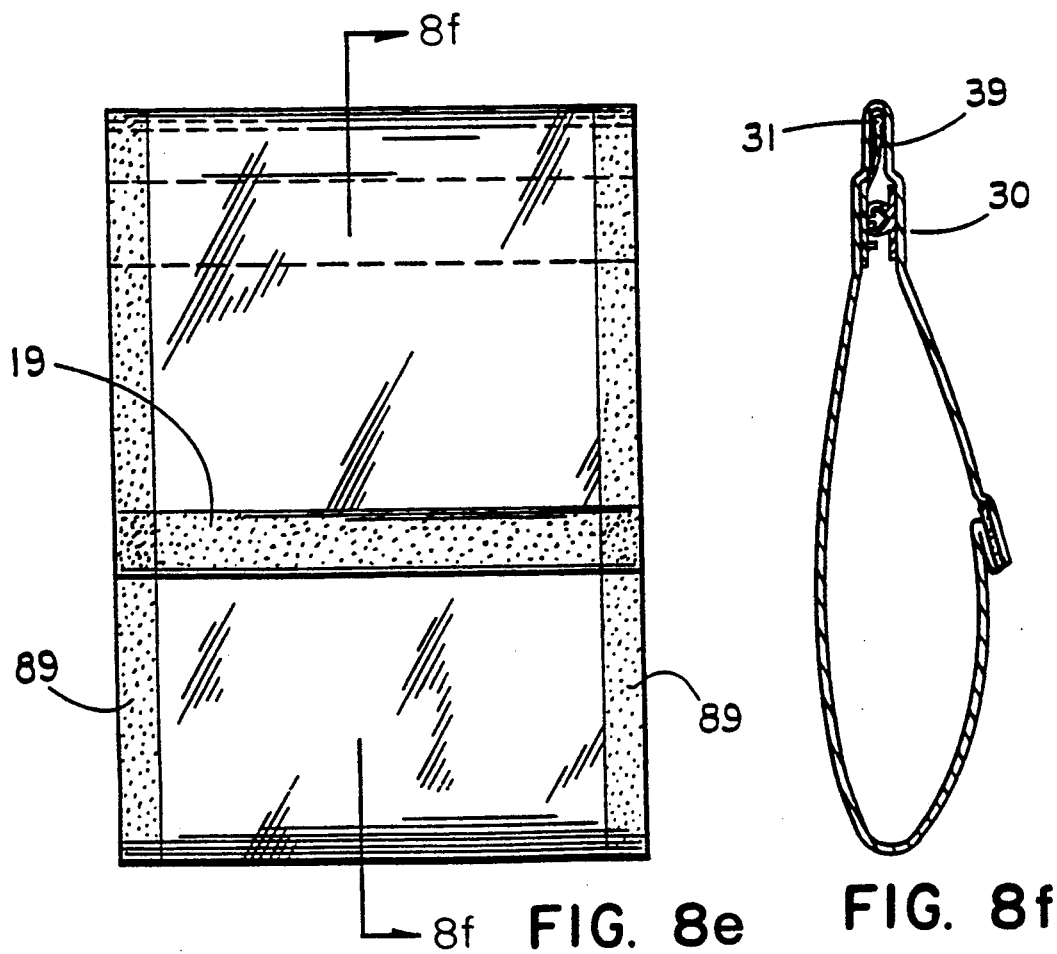
FIG. 8e
FIG. 8f

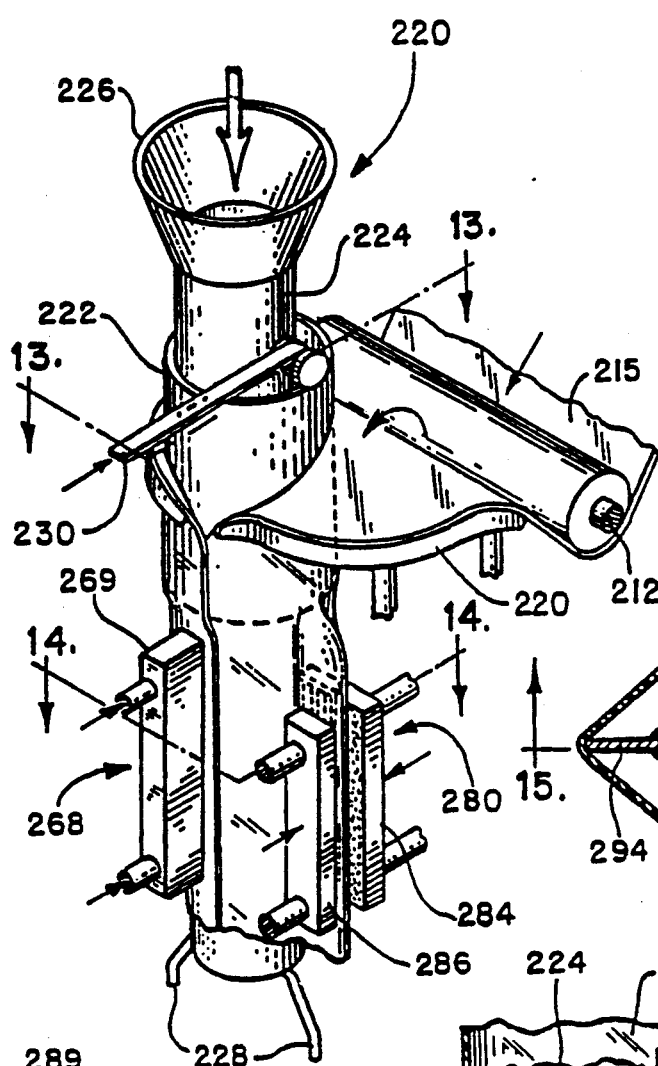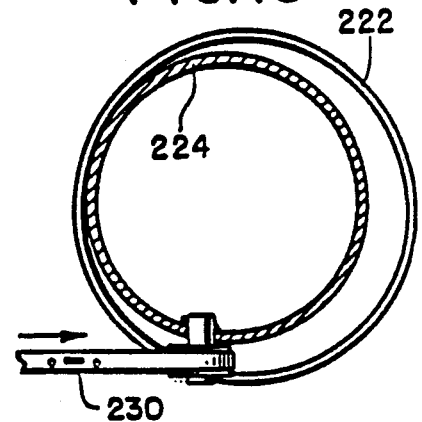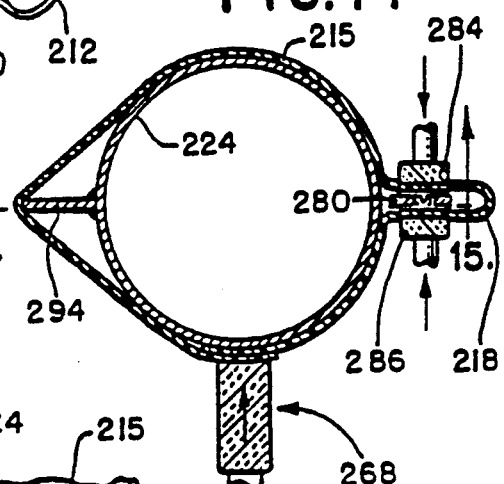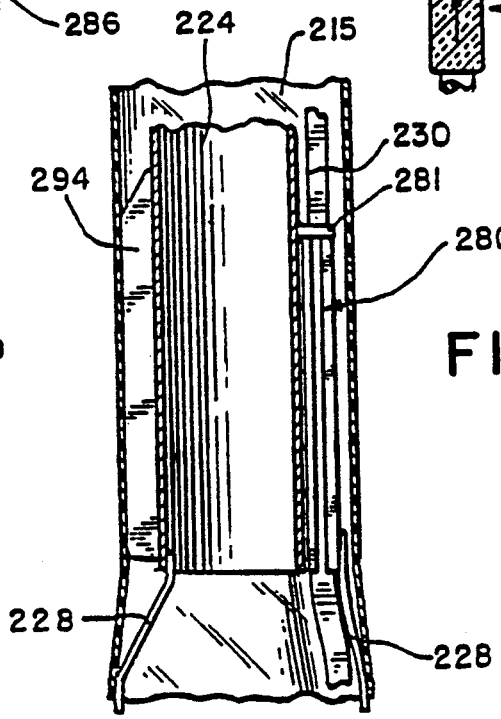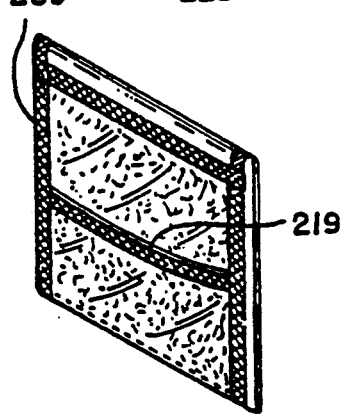

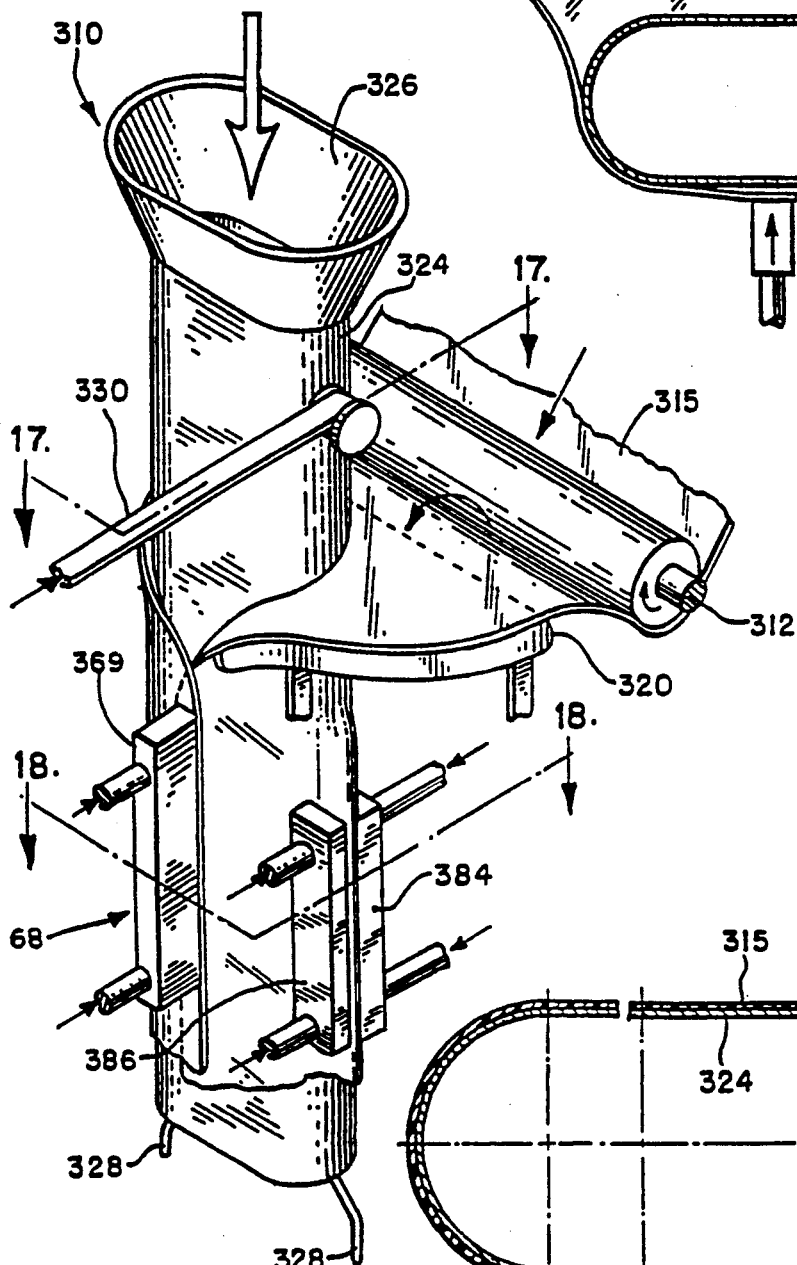
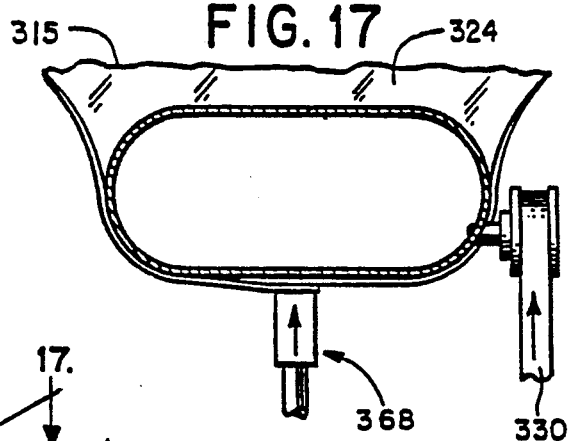
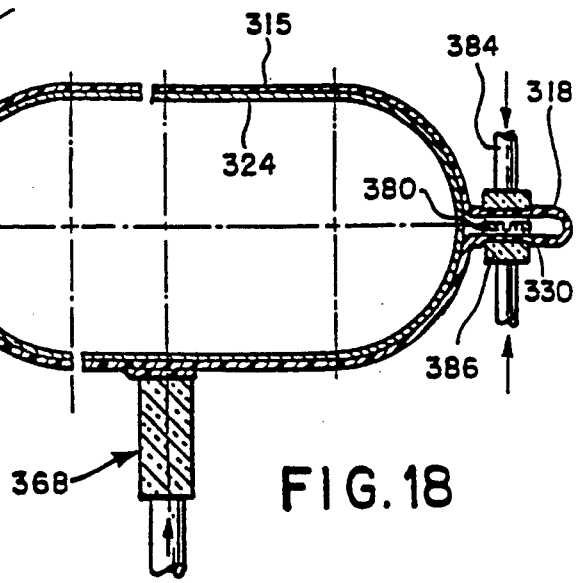

RECLOSABLE PACKAGE WITH TEAR STRIP

CROSS-REFERENCE TO RELATED APPLICATION

This application is a continuation of application Ser. No. 07/870984 filed Apr. 20, 1992, now abandoned, which is a division of application Ser. No. 07/741807 filed Aug. 6, 1991, now U.S. Pat. No. 5,127,208.

This application is a continuation-in-part application of U.S. application Ser. No. 07/600,756 filed Oct. 19, 1990 U.S. Pat. No. 5,046,300.

BACKGROUND OF THE INVENTION

The present invention relates to the field of reclosable packages and an apparatus used to apply closure elements to a packaging film and form such packages. More particularly, the invention relates to a method and apparatus for applying reclosable profile elements and a tear strip element to a packaging film in a form, fill and seal packaging operation.

One method of forming packages is known as the form, fill and seal method, wherein a continuous length of film is fed forwardly and downwardly over a forming tube, with the marginal edges of the sheet of film being sealed to each other. The thus formed tube of film is cross-sealed, and contents are dropped into the package through the tubular mandrel over which the packaging film is formed. An additional cross seal above the contents completes the package, which is then severed from the tubular film.

Reclosable packages having male and female cooperating reclosable element along an opening or seam of the package have been known for some time. Similarly, the use of a tear strip element along an opening or seam of a package has been known for some time.

There are several advantages to forming product-containing packages with such reclosable fasteners. As such, several methods have been developed to produce packages with reclosable fasteners on form, fill and seal equipment.

Many of these methods utilize packaging film which already includes the reclosable profile element affixed to the packaging film, or uses packaging film wherein the reclosable element is formed integral with the film web. By way of example, the following U.S. Pat. Nos. disclose various methods of utilizing such packaging film in forming reclosable packages:

U.S. Pat. No. 4,840,012 discloses a method and apparatus for improving the advancement of packaging film, in a form, fill and seal apparatus.

U.S. Pat. No. 4,698,954 discloses a guide mechanism disposed within the packaging film to align the feeding of the film into the filling portion of the form, fill and seal apparatus.

U.S. Pat. No. 4,727,709 discloses a steering, joining and guiding mechanism for joining together opposing rib and groove fastener elements present along the longitudinal border on a traveling continuous packaging film as the film is formed into a package.

U.S. Pat. No. 4,745,731 discloses a method and apparatus for forming reclosable storage containers wherein interconnecting members of a profile element, present along the outer border of the film, must be aligned after the film is wrapped about a forming shoulder of a form, fill and seal apparatus.

U.S. Pat. No. 4,625,496 discloses a method of moving a sheet of packaging film having a profile element integral therewith over a forming shoulder of a form, fill and seal apparatus.

U.S. Pat. No. 4,617,683 discloses reclosable bags and a method of making the same. The bags are formed from material having an extruded reclosable plastic fastener extending across the longitudinal formation axis of the packaging material prior to formation of the bags.

U.S. Pat. No. 4,790,126 discloses a fill and seal machine for reclosable bags wherein the bags are made from packaging material having zipper profiles attached equidistant from the film edges prior to feeding the material into the form, fill and seal apparatus. The open zipper profile must then be closed during an indexing cycle on the form, fill and seal apparatus.

One problem with methods and apparatus which use packaging film reclosable profiles already attached to the packaging film is that the desired combined packaging film and reclosable profile shape must be obtained for all desired combinations of packaging film, film widths, profile shape and profile locations. Another problem is that it is more bulky to store the combined profile and film than to store the elements separately. Similar problems arise with methods and apparatus which use packaging film with a tear strip element already attached to the packaging film.

Several methods have been developed wherein profiles are attached to a packaging film just prior to the introduction of the packaging film into the form fill and seal apparatus. For example, see U.S. Pat. No. 4,355,494, which discloses an apparatus for making reclosable packages wherein the reclosable packages are formed by applying the profile element to the longitudinal edges of a traveling web of packaging material. The profile elements are then joined together by multiple roller pairs which guide the profiles into engagement between a pair of press rolls.

While these methods overcome the above noted problems, they require additional equipment to compensate for the difference in the intermittent operation of the form, fill and seal equipment and the preferred continuous adhering of the reclosable profile strips to the packaging film.

Another prior art method applies the profile strips intermittently. U.S. Pat. Nos. 4,709,533 and 4,894,975 disclose a method and apparatus for forming a reclosable package wherein a reclosable profile is adhered to the outer edges of the packaging film as the edges are brought together and a fin seal is formed on a form, fill and seal machine.

One disadvantage with this disclosed method of the U.S. Pat. No. '533 of applying the profile strips while the packages are being formed is that the resulting packages have the reclosable element between the fin seal and the package contents. It would be preferable to be able to place the reclosable profile at other places on the package structure, such as at a package side opposite the fin seal on a three-sided seal package, or on one of the side edges of a pillow package. It is also preferable to affix a tear strip element to the package in relatively close proximity to the reclosable profile elements on the package structure.

SUMMARY OF THE INVENTION

The present invention provides a method and apparatus for applying a reclosable fastener and a tear strip element to a packaging film during the form, fill and seal formation of a package, and allows the reclosable profile and the tear strip element to be placed other than at the fin seal.

In one aspect, the invention is an apparatus for applying a reclosable profile element and a tear strip to a packaging film, the apparatus including a central member having an upper section and a lower section, the upper section including means for forming a longitudinally extending web of packaging film with marginal edges into a tube about a perimeter of the upper section, the lower section having an outer perimeter which is less than the tube forming perimeter of the upper section; a means for generating a loop in the packaging film, the loop running generally parallel to the axis of the tube, and utilizing packaging film which is in excess of the portion of the tube required to conform the tube to the outer perimeter of the lower section; a means for threading a reclosable profile element into the loop of packaging film; a means for adhering the reclosable profile element to the inner surface of the loop of packaging film; a means for threading a tear strip element into the loop of packaging film; and a means for adhering the tear strip element to the inner surface of the loop of packaging film. Alternatively, the tear strip element may be threaded into the loop of packaging film and not adhered to the inner surface of the loop of film.

In another aspect, the invention is a method of applying a reclosable profile element to a packaging film which includes the steps of forming a web of packaging film over a shoulder and into a tubular shape about a central member having an upper section and a lower section; joining the marginal edges of the packaging film to form the film into a tube having a perimeter larger than the outer perimeter of the lower section; advancing the tube of packaging film along he length of the central member; forming a longitudinally extending loop in the packaging film from an excess of packaging film made available by conforming the tubular packing film to follow the outer perimeter of the lower section of the central member as the packaging film is advanced along the length of the central member; threading a reclosable profile element along the length of the central member and into the loop of film; threading a tear strip element into the loop of film; adhering the reclosable profile element to the inner surface of the loop; and adhering the tear strip element to the inner surface of the loop.

In a preferred embodiment of the present invention, a pillow pack, product-filled package having reclosable profile elements is formed by forming a fin seal along a vertical length in the packaging film 90° from the loop in which the reclosable profile element is adhered.

In another preferred embodiment of the present invention, a three-sided sealed product-filled package having reclosable profile element is formed by forming a fin seal along a vertical side of the package, 180° from the loop in which the reclosable profile element is adhered.

In another preferred embodiment, the invention includes a method of and a means for applying a tear strip element to a packaging film in relatively close proximity to the reclosable profile element prior to the form, fill and seal formation of the package.

In another preferred embodiment, the reclosable profile element and the tear strip are extruded as a single unit but are configured to be easily separated or detached from one another. A reclosable profile element with a detachable tear strip element made in accordance with this preferred embodiment can be incorporated into various types of reclosable bags, pouches, or packages including, but not limited to, pre-form pouches, three-sided seal packages, horizontal overwrap packages ad packages formed on vertical and horizontal form, fill and seal machines. In this preferred embodiment, the invention includes a method and a means of adhering the reclosable profile element with a detachable tear strip element to the inner surface of a loop of packaging film, wherein the tear strip element may or may not also be adhered to the inner surface of a loop of packaging film. Alternatively, in another preferred embodiment where the reclosable profile element and the tear strip element are detachably extruded, the invention includes a method and a means of separating the tear strip element from the reclosable profile element and a method and a means for applying the tear strip element to a packaging film prior to the formation of a package.

The invention has the advantage that different profiles, tear strips, and films can be combined in an interchangeable fashion on the packaging equipment, yet the equipment is very simple. An additional advantage of the present invention is that it provides a reclosable package which is also tamper resistant, since the reclosable elements are inside of a contiguous loop of film. Additionally, in those embodiments which include a tear strip, the condition of the tear strip indicates if there has been any tampering. A purchaser of a reclosable package made in accordance with the present invention can see that he is obtaining a previously unused and unopened package.

These and other advantages, as sell as the invention itself, will be best understood with reference to the detailed description below, read in conjunction with the accompanying drawings.

BRIEF DESCRIPTION OF THE DRAWINGS

FIG. 1 is a perspective view of a preferred embodiment of the present invention.

FIG. 1a is a perspective view of a reclosable package made in accordance with a preferred embodiment of the present invention.

FIG. 2 is a cross-sectional view taken along line 2—2 of FIG. 1.

FIG. 3 is a cross-sectional view taken along line 3—3 of FIG. 1.

FIG. 4 is an expanded view of an air cylinder punch utilized with a preferred embodiment of the present invention.

FIG. 5 is a partial cross-sectional view taken along line 5—5 of FIG. 4.

FIG. 6 is a cross-sectional view taken along line 6—6 of FIG. 1.

FIG. 7 is a cross-sectional view taken along line 7—7 of FIG. 1.

FIG. 7a is a partial cross-sectional view of a fin shaper utilized on some embodiments of the present invention, taken just below line 7—7 of FIG. 1.

FIG. 8 is a partial cross-sectional view taken along line 8—8 of FIG. 1.

FIG. 8b is a cross-sectional view taken along line 8b—8b of FIG. 8a.

FIG. 8c is a cross-sectional view taken along line 8c—8c of FIG. 8a.

FIG. 8d is a cross-sectional view illustrating a preferred embodiment of a reclosable profile element and a tear strip element of the present invention.

FIG. 8e is a perspective view of a reclosable package made in accordance with a preferred embodiment of the present invention.

FIG. 8f is a cross-sectional view taken along line 8f—8f of FIG. 8e.

FIG. 9 is a perspective view of another preferred embodiment of the present invention.

FIG. 9a is a perspective view of a reclosable package made in accordance with a preferred embodiment of the present invention.

FIG. 12 is a perspective view of another preferred embodiment of the present invention.

FIG. 12a is a perspective view of a reclosable package made in accordance with a preferred embodiment of the present invention.

FIG. 13 is a cross-sectional view taken along line 13—13 of FIG. 12.

FIG. 14 is a cross-sectional view taken along line 14—14 of FIG. 12.

FIG. 15 is a cross-sectional view taken along line 15—15 of FIG. 14.

FIG. 16 is a perspective view of another preferred embodiment of the present invention.

FIG. 17 is a cross-sectional view taken along line 17—17 of FIG. 16.

FIG. 18 is a cross-sectional view taken along line 18—18 of FIG. 16.

DETAILED DESCRIPTION OF THE DRAWINGS AND PREFERRED EMBODIMENTS

Figure 8A:
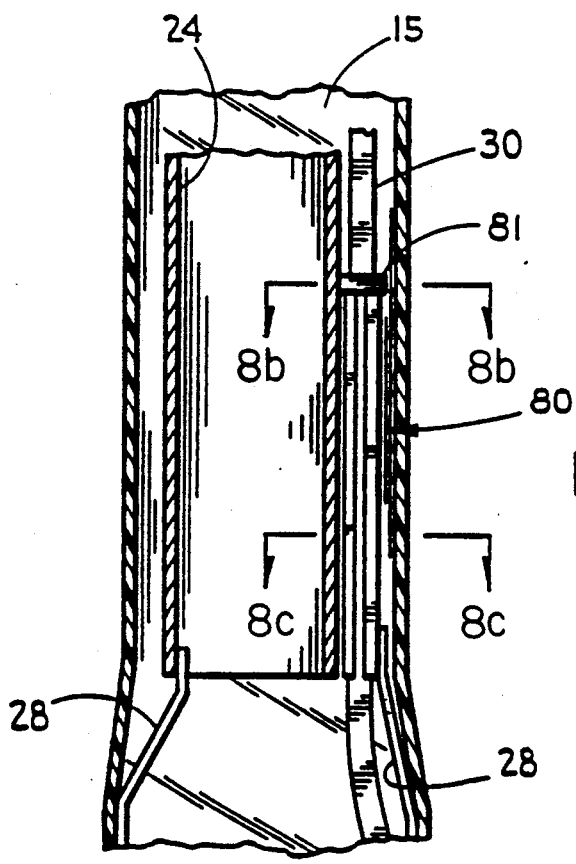
FIG. 8a is a partial perspective view of another preferred embodiment of the present invention.

Referring now to the drawings, FIG. 1 illustrates a perspective view of a preferred embodiment of the present invention. Generally, a sheet of packaging film 15 is released from an unwind apparatus 12 and formed into a reclosable package. Preferably, the reclosable package is formed on a form, fill and seal apparatus 10. The form, fill and seal apparatus 10 of the preferred embodiment of FIG. 1 includes a central member made up of a forming shoulder 20, a forming tube 22, and product till tube 24.

The forming shoulder 20 is adjacent to the forming tube 22 and is positioned to shape flat packaging film 15 received from the unwind apparatus 12 into a tubular from about the forming tube 22. In this embodiment, the forming shoulder 20 and forming tube 22 comprise a means for forming the longitudinally extending web of packaging film 15 with marginal edges into a tube about a perimeter (in this case an outer perimeter) of the upper section of the central member.

Adjacent also to the forming tube 22 is a heat seal apparatus 60, which seals the marginal edges of the packaging film 15 into a tubular form. The heat seal apparatus includes seam seal bars 62 and 64 of a conventional design.

The outer perimeter of the lower section of the central member of the form, fill and seal apparatus of FIG. 1 is defined by the outer perimeter of the product fill tube 24. The product fill tube 24 has a lesser outer perimeter than the forming tube perimeter of the upper section. The product fill tube 24 is positioned internally within the forming tube 22 and extends below the bottom of the forming tube 22. Positioned at the uppermost end of the product fill tube is a funnel 26 which receives the product and directs the product down the product fill tube 24 and into a package being formed on the apparatus.

Preferably, positioned directly below the lowermost portion of the forming tube 22 is a film shaper 70. The film shaper 70 is a collar-like device and is positioned about the product fill tube 24. Preferably, the film shaper 70 has two arms 71 and 72 each with a hook-like extension 73 and 74 on one end, best seen in FIG. 7. Opposite the hook-like extensions 73 and 74, the arms 71 and 72 are spaced a distance apart, forming an opening. The arms 71 and 72 are bolted together by a pin 75. A spring 76 is mounted between the hook-like extensions 73 and 74 of the arms 71 and 72. The film shaper 70 surrounds the product fill tube 24.

Attached to the product fill tube 24 below the bottom end of the forming tube 22 is a pre-form fin 78, best shown in FIG. 7a. The preform fin 78 is attached on the product fill tube 24 approximately at the same vertical height as the height at which the film shaper 70 encircles the product fill tube 24. The pre-form fin 78 is aligned on the product fill tube 24 to be within the opening formed between the arms of the film shaper 70.

Attached also to the product fill tube 24 is a sealing guide backup 80, best seen in FIG. 8. The sealing guide backup 80 is a two piece rigid device that is attached vertically on the side of the product fill tube 24. The first and second piece of the sealing guide backup are attached at their uppermost end by a band having an opening centered between the pieces through which the profile element is passed (not shown in FIG. 1). The sealing guide backup 80 is positioned directly beneath the pre-form fin 78 and aids in properly applying a reclosable profile element to the packaging film 15.

Additionally, adjacent to the product fill tue 24 is a profile sealer 82. Preferably, the profile sealer 82 includes two seal bars 84 and 86 which supply heat in a conventional manner. The profile sealer 82 supplies the fusion energy necessary to adhere the reclosable profile element 30 to the packaging film 15. The seal bars 84 and 86 of the profile sealer 82 are positioned on opposite sides of the sealing guide backup 80 and, when actuated, seal the reclosable profile element 30 to the packaging film 15.

Attached at the lowermost end of the product fill tube 24 is a pair of bag spreaders 28 (FIG. 1). Generally, the bag spreaders 28 are metal wires. One wire extends from the end of the product fill tube 24. The second wire extends from the lowermost end of the sealing guide backup 80. The bag spreaders 28 are designed to spread and flatten the tube of packaging film 15.

Directly beneath the bag spreaders 28 is a jaw-pull device 88 of conventional design. The jaw-pull device 88 has cross sealing jaws. The jaw-pull device 88 advances both the packaging film 15 and reclosable profile element 30. Preferably, the cross sealing jaws also form the top seal of one package and the bottom seal of the next package as the film is advance. The cross sealing jaws from the top and bottom seals 89 (FIG. 1a) in the packaging film 15 in a known manner substantially similar to the manner in which the heat seal apparatus 60 seals the packaging film into a tubular form.

In accordance with the preferred embodiment of the present invention, a reclosable profile element 30 having male and female cooperating elements and flanges 32 is threaded downward along the vertical length of the form, fill and seal apparatus. Preferably, the reclosable profile element 30 is threaded downward between the product fill tube 24 and the forming tube 22, along the outer perimeter of the product fill tube 24, as shown in FIG. 2. The reclosabl profile element 30 is guided into a loop of packaging film and adhered to the inner surface of the loop, detail of this will be described later in connection with FIGS. 7, 7a, and 8.

Preferably in advance of threading the reclosable profile element 30 into the form, fill and seal apparatus, a portion of the reclosable profile element 30 is punched out and pre-punch seals are formed. As the reclosable profile element 30 is fed from a suitable supply 14 (FIG. 1) to the form, fill and seal apparatus, is it threaded through a pre-punch seal apparatus 40. Preferably the pre-punch seal apparatus 40 forms a pair of heat seals 41 in the profile element that are incrementally spaced. The pre-punch seal apparatus forms the seals 41 in the reclosable profile element 30 to lock the male and female members of the profile element 30 together. Accordingly, the seals 41 are formed to prevent slippage of one member of the profile element relative to the other, along their length, as the profile element 30 is advanced.

Referring now to FIG. 3, a cross-section of the pre-punch seal apparatus 40 is shown. The profile element 30 is guided through the bottom 42 of the pre-punch seal apparatus 40. A pair of heated cartridges 44, surrounded by an insulating material 48, each supports a heated probe 46. The probes 46 are intermittently forced downward into the profile element 30 as the profile element 30 is guided through the bottom 42 of the apparatus.

Accordingly, at incremental time intervals, synchronized with the dwell period during the jaw-pull cycle, the heated probes 46 are extended simultaneously through the upper flange 32 and upper cooperating element 36 of the profile element 30 and into a portion of the lower cooperating element 38 of the profile element 30. The heated probes 46 thus form the pair of seals 41 in the profile element 30. The seals 41 may be spaced at a distance slightly greater than the width of the combined top and bottom cross-seals 89 formed by the jaw-pull apparatus 88. Optionally, the spacing between the seals 41 may be varied according to specifications of the package desired.

After the heated probes 46 are retracted from the profile element 30, the element is guided through a punch device 50, depicted in FIGS. 1 and 4. The punch device 50 removes portions of the flanges 32 and 34 and cooperating elements 36 and 38 of the profile element 30. The profile is passed through the bottom 52 of the punch device 50. At intervals while the profile is stationary, a punch 54 is extended through the profile element 30 to sever out a rectangular area 51. The rectangular area 51 cut away from the profile element is shown in FIG. 5. Preferably an air-cylinder 56 is used to actuate the punch 54.

The rectangular areas 51 punched out of the profile element 30 are incrementally spaced to be in between the heat seals 41 and in register with the cross seals 89 formed by the jaw-pull device 88 as the packaging film is formed into a package. Accordingly, where the cross seals 89 are formed, the mass of the cooperating elements 36 and 38 is not present. This makes it easier for the jaw-pull cross sealer to form hermetic cross seals 89.

Referring now to FIG. 6, in forming the packaging film 15 into a tubular shape about the forming tube 22, marginal edges 16 and 17 of the web of packaging film 15 are brought together to be sealed, Preferably, the sealing is a heat seal process. Seam seal bars 62 and 64 exert an external pressure along the vertical length of the edges 16 and 17 of the film 15 to form a fin seal 19 (FIG. 1a). Optionally, a lap seal may be used to seal the packaging film into a tubular form. Lap seals are known in the art and therefore not discussed in detail. Edges of single layer or multiple layer film may be sealed in this manner.

FIG. 1a illustrates a pillow product filled package having reclosable profile elements made in accordance with the present invention. A pillow product filled package is constructed by forming the cross seals 89 such that the package has the fin seal 19 on the face, rather than on one of the sides of the package. Optionally, a pillow product filled package may be constructed by forming a lap seal in place of the fin seal 19.

After the fin seal 19 is formed, the packaging film 15 is advanced downward from the forming tube over the exposed portion of the product fill tube 24. As noted above, the product fill tube 24 has a lesser outer perimeter than the outer perimeter of the forming tube 22. As the film 15 is advanced, an excess of film is made available due to the differences in outer perimeters of the forming tube 22 and product fill tube 24. The film shaper apparatus 70 guides the film 15 to conform to the outer perimeter of the product fill tube 24 and guides the excess film to form a loop of film 18 running generally parallel to the axis of the tube of film, as seen in FIGS. 1 and 7. The spring 76 mounted between the hook-like extensions 73 and 74 of the film shaper applies pressure to the arms 71 and 72 of the shaper such that the arms 71 and 72 encompass the packaging film 15 as it is advanced downward over the product fill tube 24. The loop 18 of the packaging film 15 is formed in the opening between the arms as it is advance over the pre-form fin 78. Accordingly, the pre-form fin 78 initiates orientation of the loop 18 to smooth advancement of the loop 18 over the sealing guide backup 80 (FIG. 8). The reclosable profile element 30 is threaded downward to one side of the pre-form fin 78 and into the loop 18 of packaging film (FIG. 7a).

Referring now to FIG. 8, as the profile element 30 is guided into the loop 18, the flanges 32 and 34 of the profile are oriented on either side of the sealing guide backup 80. The sealing guide backup 80, located adjacent to the product fill tube 24, provides a rigid sealing backup for adhesion of the profile element 30 to the film 15. As shown in FIG. 8, the two pieces of the backup 80 are spaced so that the cooperating elements 36 and 38 can remain mated as the profile element 30 passes down the sealing guide.

Generally, the profile element 30 is adhered to the inner surface of the loop 18 by a heat sealing process. Preferably, a profile sealer 82 having heated seal bars 84 and 86 seals the outside of the profile element 30 to the two inside surfaces of the film loop 18 by supplying a squeezing pressure inward toward each other. Preferably, only a single actuator is used to supply this pressure. Use of a single actuator prevents damage to the sealing guide backup 80, which may result if the two seal bars 84 and 86 were actuated separately.

As the packaging film and profile assembly is advanced, it is drawn over a pair of bag spreaders 28 by the jaw pull device 88, as illustrated in FIG. 1. The bag spreaders spread the assembly as flat as possible to permit better sealing of the top and bottom seams of the package.

The jaw pull device 88 has cross sealing bars that heat seal the packaging film and profile assembly. The jaw pull device 88 also includes conventional severing means for cutting the film 15 between a top seal in one assembly and a bottom seal in the next advancing assembly. Prior to forming the top seal on each package, a product is funneled down the product fill tube 24 and into the packaging film and profile assembly already having a bottom cross seal.

In a preferred embodiment of the present invention, a tear strip 31 is fed alongside the profile element 30 into the loop of film 18. The tear strip 31 aids in opening the resultant package and in indicating if the package has been tampered with in any manner.

In one preferred embodiment of the present invention, the tear strip 31 is adhered to the inner surface of the loop of film in a manner substantially similar to the manner in which the reclosable profile element is adhered to the inner surface of the loop of film 18 as illustrated in FIG. 8.

Referring now to FIG. 8a, in this preferred embodiment, a tear strip element 31 is threaded downward along the vertical length of the form, fill and seal apparatus. Preferably, the tear strip element 31 is threaded downward between the product fill tube 24 and the forming tube [not shown], along the outer perimeter of the product fill tube 24, as shown in FIG. 8a. The tear strip 31 is guided into a loop of packaging film 18. In this preferred embodiment the sealing guide backup 80, which is attached vertically on the side of the product fill tube 24, includes a tear strip guide extension 81 which orients the tear strip 31 and provides a rigid sealing backup for adhesion of the tear strip 31 to the loop of packaging film 15. Optionally, the tear strip sealer may be independent and not part of the sealing guide backup 80.

Figure 8B:
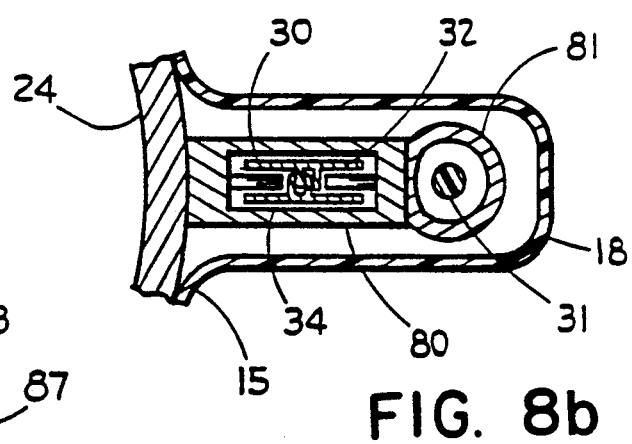

As illustrated in FIG. 8b, the tear strip element 31 may be guided into the loop 18 and oriented within the loop 18 by means of a tear strip guide extension 81 to the sealing guide backup 80. Preferably, the extension 81 to the sealing guide backup 80 has at its uppermost end a band having an opening through which the tear strip element 31 is threaded into the loop of packaging film. Preferably, the tear strip guide opening is circular and has an inner diameter which is greater than the greatest cross-sectional dimension of the tear strip element 31. The tear strip element 31 may take the form of various geometric shapes including, but not limited to, rectangular, triangular, square, or circular strips. In an alternative preferred embodiment, the tear strip element 31 is not adhered to the inner surface of the loop of film 18. Rather, the tear strip element 31 is threaded into the loop of film 18 as illustrated in FIG. 8b and remains loose and unadhered to the film within the loop 18.

Preferably, as the cross-sealing jaws of the jaw pull device or other sealing means form the top seal of one package and the bottom seal of the next package, the tear strip element is affixed to the packaging film within the area of the cross-seals.

Figure 8C:
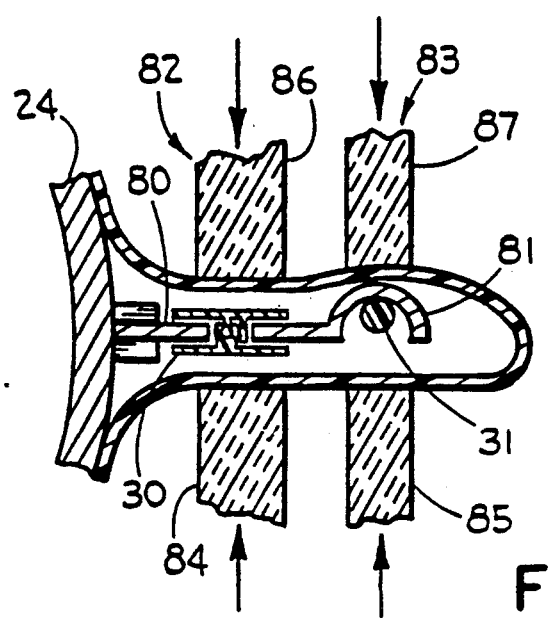

As illustrated in FIG. 8c, the tear strip element 31 is adhered to the inner surface of the loop 18 by a heat sealing process. Preferably a tear strip sealer 83 is located adjacent to the product fill tube 24. Optionally, the tear strip sealer 83 may be attached, or is an extension, to the profile sealer 82. Preferably the tear strip sealer 83 includes two tear strip seal bars 85 and 87 which supply heat in a conventional manner. The tear strip sealer 83 supplies the fusion energy necessary to adhere the tear strip element 31 to the packaging film 15. The tear strip seal bars 85 and 87 are positioned on opposite sides of the tear strip guide extension 81 and, when actuated, seal the tear strip element 31 to the packaging film 15. Preferably a tear strip sealer extension 83 having at least one heated seal bar 85 and a support bar 87 (which may be heated) seals the tear strip element 31 to at least one of the inside surfaces of the film loop 18 by supplying a squeezing pressure inward. Preferably, only a single actuator is used to supply this pressure to prevent damage to the tear strip guide extension 81.

In an alternative preferred embodiment, the reclosable profile element 30 and the tear strip element 31 are extruded as a single unit. Preferably, they are extruded with a thin bridge between them which allows the tear strip element 31 to be easily separated from the reclosable profile element and the tear strip element is severed from the flange element prior to adhering the tear strip to the packaging film. Preferably, the profile element 30 and the tear strip element 31 are detachably extruded as illustrated in FIG. 8d.

Typically, the extrusion die used to produce a reclosable profile element is cut with a shaped slot from which molten plastic extrudes. The shape of the slot determines the cross sectional "profile" of the reclosable element. To extrude a reclosable profile element with a detachable tear strip element as illustrated in FIG. 8d, one skilled in the art could, with minimal experimentation, shape the extrusion die slot to include an attached tear strip element.

Generally, the amount of molten plastic used to tie or bond the reclosable element and tear strip element determines the amount of force required to detach the tear strip element from the reclosable profile element. By varying the amount of plastic used to tie or bond the reclosable profile element and the tear strip element one can vary the amount of force required to detach or separate the tear strip element from the reclosable profile element in accordance with their intended use. For example, by varying the amount of plastic one can vary the degree of force required to separate the tear strip element from the profile element. Use of a relatively small amount of plastic permits the tear strip element to be easily separated from the reclosable profile element by a flow force; generally not requiring a mechanical means to detach the elements from one another. Use of a greater amount of plastic will result in a higher amount of force being required, such as force that requires a cutting or splitting utensil to detach the elements from one another. Preferably, the plastic used to tie or bond the reclosable profile element 30 with the detachable tear strip element 31 forms a bridge 37 between them as illustrated in FIG. 8d. The thickness of the bridge 37 is dependent upon the amount of force one desires to use to detach the tear strip element 31 from the reclosable element 30.

In addition, the reclosable profile element and/or the detachable tear strip element may be incompatible with the packaging film or the substrate to which the profile strip is to be attached. Under such conditions adhesive strips or an adhesive layer can be co-extruded with both the reclosable profile element and with the tear strip element. An adhesive strip is employed to provide an adequate seal between the substrate and the reclosable profile element or tear strip element.

Preferably, the adhesive strip 33, as illustrated in FIG. 8d, is made of a material which will adhere well to both the reclosable profile element 30, the detachable tear strip element 31, and the packaging film or substrate employed [not shown]. In a typical packaging process, such as a form, fill and seal process, the reclosable profile strip 30 is hermetically sealed to the packaging film. Therefore, preferably the adhesive strip 33 or layer should be made from a material that provides a hermetic seal between the adhesive strip and the packaging film. The exact dimensions of the adhesive strips 33 and the adhesive-free area 35 on the reclosable profile element 30 and tear strip element 31 is dependent on the type of adhesive used. One of ordinary skill in the art will be readily able to determine such exact dimensions, with minimal experimentation, for a particular combination of the material used for the adhesive strip 33, the reclosable profile element 30, and the tear strip element 31. Preferably the co-extrusion produces a reclosable profile element 30 with a detachable tear strip 31 which, upon cooling, is substantially free of deformation. As discussed previously the tear strip element 31 may be in the form of various geometric shapes but to facilitate the combining of the tear strip to the packaging film preferably a rectangular or triangular shaped tear strip element is employed. Therefore, preferably straight cuts are formed in the extrusion die to create flat sides 39 on the resulting tear strip element.

Generally, to produce an extruded profile consisting of one or more than one material, an extruder means is required for each different material. The shape or configuration of the openings or slots on the extrusion means determines the shape of the profile product. U.S. patent application Ser. No. 07/600,764, filed on Oct. 22, 1990, which discloses a coextruded profile strip containing lateral webs with adhesive subdivided into ribs and a method of forming the same is herein incorporated by reference.

Typically, when different materials are to be extruded together the co-extruded layers may be combined internally within the extrusion means, or externally after exiting the extrusion means, to form a co-extruded profile element and tear strip element. Upon exiting the extrusion means, the molten plastic must be cooled to freeze the shape and bring the profile to a state of strength and toughness needed for storage.

Typically, the reclosably profile element and detachable tear strip element are formed from polyolefins. Preferably, they are formed form low density polyethylene (LDPE) which is a low cost material that results in significant savings in material costs. By extruding the reclosable profile element with detachable tear strip element as a single unit, with or without an adhesive strip, a continuous length of the combined elements is produced in such a manner that they may be wrapped onto a spool and stored as one unit until the unit is needed in a packaging process. Optionally, before storing a reclosable profile element with a detachable tear strip the two may be severed from each other, wrapped onto separate spools and stored individually until they are needed in a packaging process.

Referring again to FIGS. 8a, 8b, and 8c the sealing guide backup 80 with the tear strip guide extension 81 may be modified to permit a reclosable profile element 30 with a detachable tear strip element 31 to be guided into the loop 18 of packaging film. The reclosable profile element 30 is oriented within the loop 18 of film and adhered to the inner surface of the loop 18 in substantially the same manner as that discussed above with respect to FIG. 8. In this preferred embodiment, the tear strip element 31 may also be adhered to the inner surface of the loop 18 of film in substantially the same manner as that discussed with respect to FIG. 8c. Alternatively, the tear strip element 31 is removably attached only to the reclosable profile element 30 and remains unattached or loose from the packaging film. FIG. 8e illustrates a pillow product filled package having a reclosable profile element 30 and a tear strip element 31 which are detachabley extruded. FIG. 8f shows a cross-sectional view of the pillow product filled package of FIG. 8e wherein the tear strip element 31 is removably attached solely to the reclosable profile element 30 and is not adhered to the packaging film 15. In these preferred embodiments in which the reclosable profile element 30 and the tear strip element 31 are detachably extruded, the tear strip element 31 is separable from the reclosable profile element 30.

Preferably a reclosable profile element with a detachable tear strip element made in accordance with this preferred embodiment can be incorporated into various types of reclosable packages, bags, or pouches. Examples of such packages into which a reclosable profile element with a detachable tear strip may be incorporated include, but are not limited to, the following: pre-formed pouches and bags; three sided-seal packages wherein the reclosable profile element with detachable tear strip is affixed to the film before forming a package packages formed on a horizontal, form, fill and seal machine; and overwrap packages including horizontal overwrap packages which produce pillow packages. Preferably, any bag, pouch or packaging operation which utilizes a reclosable means could incorporate a reclosable profile element with a detachable tear strip element made in accordance with this preferred embodiment.

Alternatively, in another preferred embodiment of the present invention, the form, fill and seal apparatus is substantially similar to the form, fill and seal apparatus illustrated in FIG. 1 and described with respect thereto. However, in this preferred embodiment, the film shaper 70 and the pre-form fin 78 are not included. In stead, as the packaging film 15 advances from the forming tube 22 to the product fill tube 24, the film 15 is deformed to contour to the outer perimeter of the product fill tube 24 by also shifting to surround the sealing guide backup 80. The sealing guide backup 80 facilitates forming the loop of packaging film 18 into with the reclosable profile element 30 is threaded. The profile element 30 is guided into the loop 18 by being threaded through the sealing guide backup 80. The profile element 30 is adhered to the inner surface of the loop 18 as previously described. Since there is no preform fin, the top of the sealing guide backup 80 in this embodiment must be free of sharp edges to avoid damaging the film.

Figure 10:
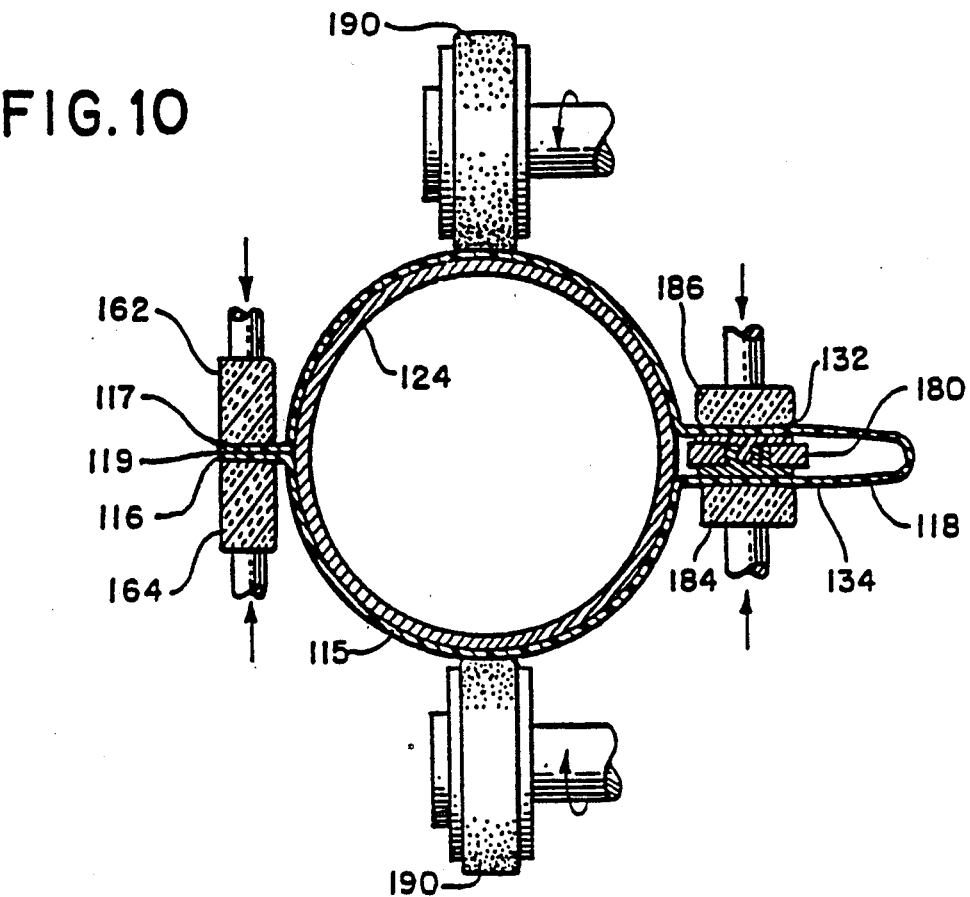
FIG. 10 is a cross-sectional view taken along line 10—10 of FIG. 9.

Another embodiment of the invention is shown in FIGS. 9-10. Most components of the form, fill and seal apparatus illustrated in FIG. 9 are substantially similar to components of the form, fill and seal apparatus illustrated in FIG. 1. These components are denoted with the same reference numeral, increased by a factor of 100. For example, the forming shoulder 120 of the embodiment illustrated in FIG. 9 is substantially similar to the forming shoulder 20 illustrated in FIG. 1. (In FIG. 9, the packaging film is broken away to show the band 181 connecting the two pieces of the sealing guide backup 180.)

In the alternative embodiment of the present invention illustrated in FIG. 9, the packaging film 115 is advanced downwardly over the form, fill and seal apparatus through engagement of the outer surface of the film 115 by a pair of frictional or vacuum belts 190 diametrically opposite one another. The pair of belts 190 are constructed essentially identical such that equal and opposite forces are applied to the film 115 as it is advanced downwardly. Such belts are well known in form, fill and seal apparatus. In this embodiment, each belt is positioned adjacent to the product fill tube 124 and is spaced 90° around the circumference of the fill tube 124 from where the profile element 130 is adhered to the film 115 by the profile sealers 184 and 186.

FIG. 9a illustrates a three sided seal product filled package having reclosable profile elements made in accordance with the apparatus of FIG. 9. The three sided seal package is constructed by forming the fin seal 119 in the packaging film diametrically opposite from the film from which the loop 118 having the reclosable profile element 130 is formed. Also, the cross seal jaws 188 are positioned to form the cross seals 189 so that the resulting package has the fine seal 119 on one of the side edges of the package.

Optionally, a three-sided seal product fill package having reclosable profile elements may be constructed by forming a lap seal in the packaging film instead of a fin seal. Accordingly, such a lap seal of three-sided seal package is formed 180° from where the loop 118 and reclosable profile element 130 is positioned.

FIG. 10 shows how the reclosable profile element 130 is threaded into the loop 118 of excess packaging film which is formed in a manner substantially similar to that described previously. The reclosable profile element is adhered to the inner surface of the loop 118 by the profile sealing bars 184 and 186. Optionally, a tear strip element may also be included within the loop 118 by any of the manners discussed previously or discussed below.

FIG. 10 also shows the fin seal 119 spaced 180° from the loop 118 of excess packaging film. In this preferred embodiment, the heat seal apparatus 160, which seals the packaging film into a tubular form, is located adjacent to the product fill tube 124, positioned 90° from each frictional or vacuum belt 190. By locating the heat seal apparatus 160 at least partially longitudinally adjacent to the profile sealer and the product fill tube 124, the length of the forming tube, and thus the overall height of the machine, may be reduced.

Figure 11:
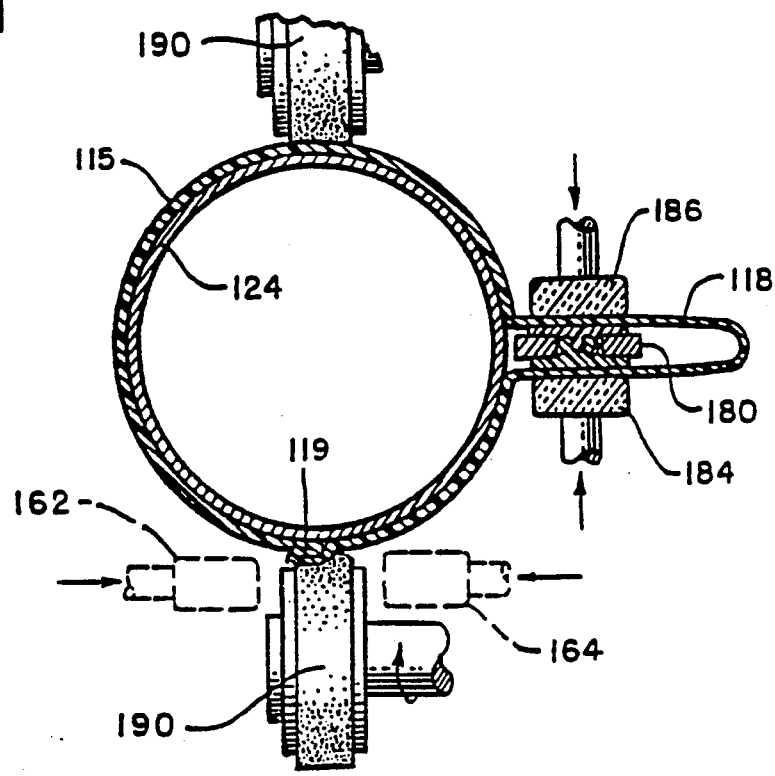
FIG. 11 is a cross-sectional view illustrating a portion of an alternative preferred embodiment similar to the embodiment of FIG. 9.

Referring now to FIG. 11, a cross-sectional view of an alternative preferred embodiment of the present invention is shown. FIG. 11 depicts a cross-sectional view of a form, fill and seal apparatus substantially similar to that of FIG. 9. However, in this preferred embodiment, the heat seal apparatus (not shown) is located adjacent to the forming tube 122 and the fin seal 119 is formed 90° from where the profile is attached. As the film 115 is deformed over the product fill tube 124, one of the pair of belts 190 is aligned to come in contact with the fin seal 119. Also, the cross seal jaws are located directly underneath each belt drive. Accordingly, the resulting reclosable package made in accordance with this preferred embodiment is a pillow product filled package substantially similar to the pillow package illustrated in FIG. 1a.

In another preferred embodiment of the present invention, the form, fill and seal apparatus is substantially similar to the form, fill and seal apparatus illustrated in FIGS. 9 or 11 and described with respect thereto. However, in this preferred embodiment, the film shaper 170 and the pre-form fin 178 are not included. Instead, the sealing guide backup 180 facilitates in forming the loop 118 into which the reclosable profile element 130 is threaded, as described earlier with the embodiment similarly modified from that shown in FIG. 1.

Either the pillow product filled package or three sided seam seal package can be formed in the apparatus without the film shaper and preform fin.

Another preferred embodiment of the present invention is partially shown in FIG. 12. Many components of the form, fill and seal apparatus of this preferred embodiment are substantially similar to components of the form, fill and seal apparatus illustrated in FIG. 1. The components of the preferred embodiment illustrated in FIG. 12 which are substantially similar to components illustrated in FIG. 1 are denoted with the same reference numeral, increased by a factor of 200. For example the forming shoulder 220 illustrated in FIG. 12 is substantially similar to the forming shoulder 20 illustrated in FIG. 1.

One of the differences between the embodiment of FIG. 12 and the earlier described embodiments is that the forming tube 222 is very short. Adjacent to the product fill tube 224, and below the lowermost end of the forming tube 222, is a heat sealing apparatus 268, which seals the packaging film into tubular form. The heat sealing apparatus illustrated in FIG. 12 includes a seam seal bar 269 and forms a lap seal.

Another difference between the embodiment of FIG. 12 and the earlier described embodiments is that the overall length of the product fill tube 224 is minimized from that of the earlier described embodiments.

Attached to the product fill tube 224 is a sealing guide backup 280 which is substantially similar to the sealing guide backup 80 of FIG. 1. Adjacent to the product fill tube 224 is a profile sealer 282, also substantially similar to the profile sealer described in FIG. 1.

Another major difference in this embodiment is the inclusion of a balancing fin 294, longitudinally extending outwardly from the fill tube 224 (best shown in FIGS. 14 & 15). The fin 294 is positioned 180° from the sealing guide backup 280. The fin 294 enables a lap seal to be formed in approximately the same plane of the fill, form and seal apparatus as the profile sealer 282 adheres the reclosable profile element 230 to the packaging film 215. FIG. 14 also illustrates how the packaging film conforms about the product fill tube 224, balancing fin 294, and sealing guide backup 280. As shown, the outer perimeter of the lower section of the central member in this embodiment is the shortest distance required to circumnavigate around the combined fill tube 224 and fin 294.

In accordance with this preferred embodiment, the packaging film 215 is formed about the forming shoulder 220 and advanced downward over the product fill tube 224. The balancing fin 294 provides symmetry in the film drag as it advances about the product fill tube 224. In this preferred embodiment, not only is the length of the forming tube 222 reduced, but the length of the product fill tube 224 is also minimized, resulting in a very compact form, fill and seal machine.

FIG. 12a illustrates a pillow product filled package made in accordance with this preferred embodiment. The pillow product filled package is constructed by forming the lap seal in the packaging film 90° from the loop 218 and reclosable profile element 230. Optionally, a tear strip element may also be included within the loop 218 in the manner discussed previously or in the manner discussed below.

Referring now to FIG. 16, a perspective view of another embodiment is shown. In this preferred embodiment, the product fill tube 324 has an oblong shape. The forming collar or forming shoulder 320 envelops the product fill tube 324 and produces an oblong shaped film tube. In this embodiment, the forming collar or forming shoulder 320 terminates in inner perimeter which is larger than the outer perimeter of the product fill tube 324. Hence, the tube forming perimeter of the upper section of the form, fill and seal apparatus of this embodiment is the inside perimeter of the forming collar or forming shoulder 320. No forming tube is utilized. The product fill tube 324 extends above and below the forming collar 320.

In this preferred embodiment, the packaging film 315 is feed from an unwind apparatus onto to the forming collar or forming shoulder 320. The sheet of packaging film 315 conforms about the terminating perimeter of the forming shoulder. The film is then advanced along the length of the form, fill and seal apparatus. As the film 315 is advanced, it is deformed to conform to the outer perimeter of the product fill tube 324 and creates a loop 318 about a sealing guide backup 380 (FIG. 18). Preferably, a lap seal is made in the film by a lap sealer 368 after the film has advanced from the forming collar to the product fill tube 324. Optionally, a lap seal or fin seal may be applied when the packaging film is formed about the forming collar or forming shoulder 320.

Referring now to FIG. 17, the reclosable profile element 330 is threaded downward along the vertical length of the form, fill and seal machine 310. Preferably, the reclosable profile element is threaded downward between the product fill tube 324 and the forming collar or forming shoulder 320, along the outer perimeter of the product fill tube 324. Optionally, a tear strip element may also be included in this preferred embodiment.

The use of an oblong product fill tube enables a lap seal to be formed in approximately the same plane of the fill, form and seal apparatus as that at which the profile sealer adheres the reclosable profile element to the packaging film. Additionally, the use of an oblong product fill tub increases the fill tube cross-sectional area over that of a form, fill and seal apparatus having around product fill tube and balancing blade.

In alternative preferred embodiments, the tear strip is adhered to the packaging film immediately prior to the form, fill and seal operation of the present invention. In these preferred embodiments, the tear strip is adhered to the packaging film such that its position in the final package structure is in relatively close proximity to the reclosable profile element and is placed or adhered so that it is parallel to the profile element in the resulting package structure. Details of these alternative preferred embodiments will be described below in connection with FIGS. 19 through 23.

Figure 19:
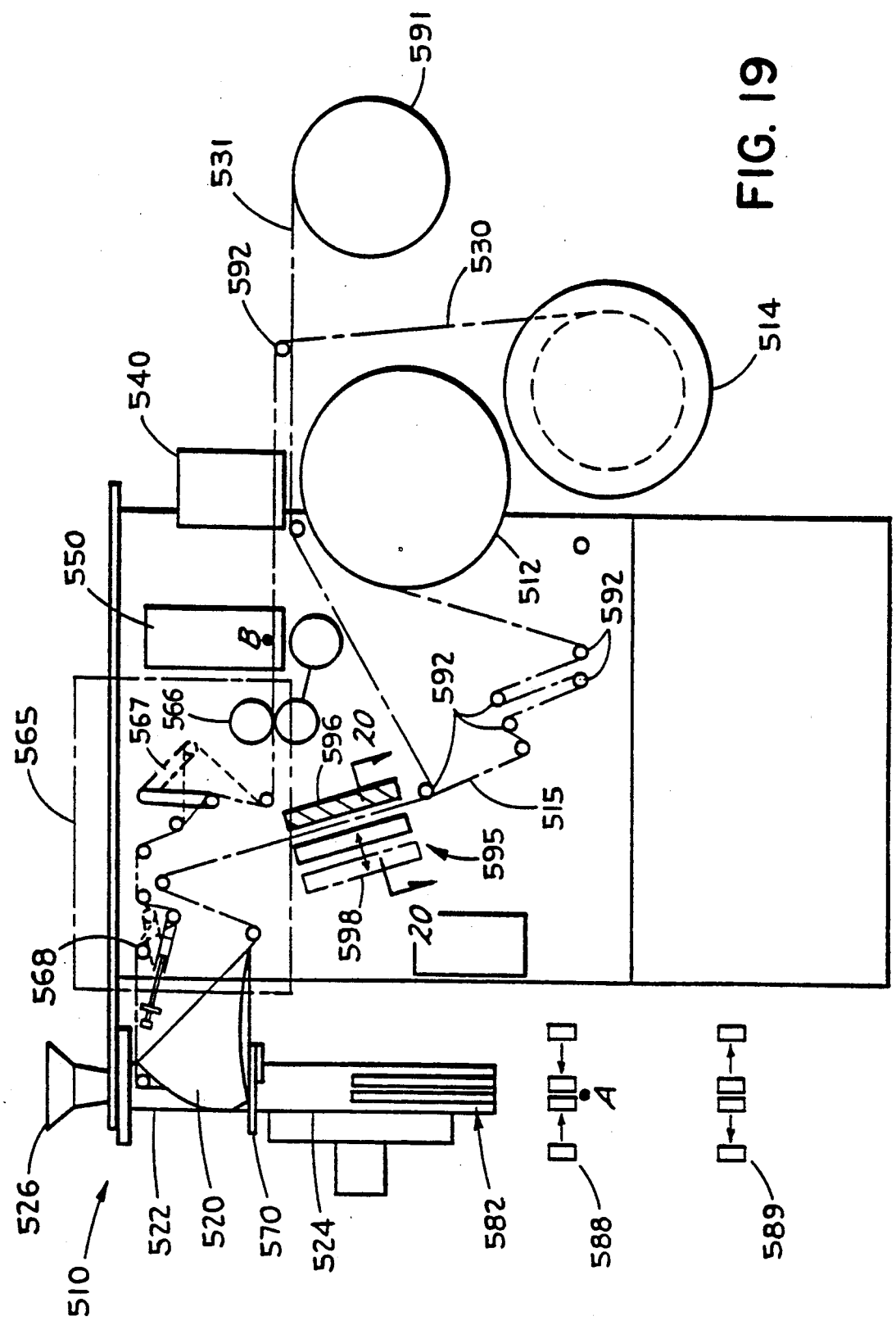
FIG. 19 is a schematic view of another preferred embodiment of the present invention.

Another preferred embodiment of the invention is shown in FIG. 19. Most of the components of the form, fill and seal apparatus illustrated in FIG. 19 are substantially similar to components of the form, fill and seal apparatus illustrated in FIGS. 1, 9, 11, 12 and 16. The components of the preferred embodiment illustrated in FIG. 19 which are substantially similar to components illustrated in FIG. 1 are denoted with the same reference numeral increased by a factor of 500. However, in this preferred embodiment, the tear strip element 531 is adhered to the packaging film 515 prior to forming the packaging film 515 into a reclosable package having a tear strip. As illustrated in FIG. 19, located in proximity to the form, fill and seal apparatus is an apparatus 595 for adhering a tear strip element 531 to the web of packaging film.

In accordance with this preferred embodiment, a tear strip element 531 is unwound form a supply source 591 and is guided over a series of stationary rollers or idlers 592 and into a heat sealing apparatus 595. Simultaneously, the packaging film 515 is also unwound from a supply source 512 and is also guided over a series of stationary rollers or idlers 592 and into the heat sealing apparatus 595.

Figure 20:
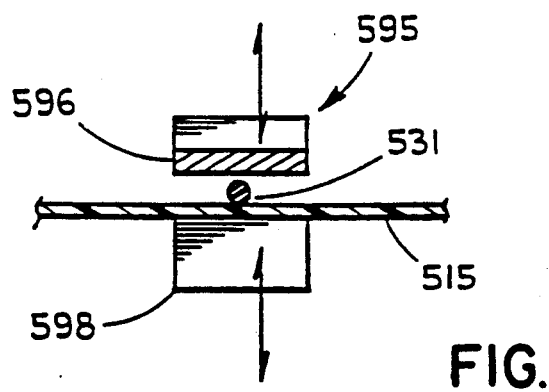
FIG. 20 is a cross-sectional view taken along line 20—20 of FIG. 19.

Preferably the tear strip element 531 and the packaging film 515 are guided between a heat seal bar 596 and a seal platen 598 which comprise the heat sealing apparatus 595. Accordingly, at incremental time intervals, the tear strip element 531 is adhered to the packaging film 515 by a heat sealing process. Preferably the heat seal bar 596 intermittent seals the tear strip element 531 to the packaging film 515 by supplying a squeezing pressure, inward toward the seal platen 598, as illustrated in FIG. 20. Preferably the time intervals are synchronized to occur during the dwell period of the jaw-pull cycle. Most preferably the tear strip element 531 is adhered to the packaging film 515 at intervals while the reclosable profile element 530 is stationary. After the tear strip element 531 is adhered to the packaging film 515, the film is drawn about the form, fill and seal apparatus and formed into a package having a reclosable profile element 530 in the manner described previously. Alternatively, this apparatus may be used in the making of various forms of reclosable packages with tear strips. Preferably, to ensure that the reclosable profile element 530, is synchronized properly such that the rectangular punched out areas of the reclosable profile element are incrementally spaced and in register with the cross-seals formed by the jaw pull device or other sealing means as the packaging film is formed into a package, the packaging apparatus may be configured to include a series apparatus which operate to registrate and/or adjust the length of the reclosable profile element. An example of such a series of apparatus is illustrated as reference numeral 565 in FIG. 19.

As illustrate in FIG. 19, and in accordance with the preferred embodiment, the length of the reclosable profile element 531 between A and point B must be a multiple of the desired package length. Preferably, the length of the reclosable profile element between points A and B is an exact multiple of the length of the desired package. The multiple distance is utilized to keep the punched out areas of the reclosable profile element incrementally spaced and in register with the cross seals formed as the packaging film is formed into a package structure. The pre-punch seal apparatus 540 and the punch device 550 can create a drag on the reclosable profile element 530. Therefore, preferably an infeed drive means 566 is added to control the tension of the reclosable profile element. To ensure that constant force or tension is exerted on the reclosable profile element 530, a loaded accumulator dancer 567 may be utilized. Additionally, to adjust the length of the reclosable profile element 530 between points A and B, a registration adjustment means 568 is used. Preferably such registration adjustment means includes a series of adjustable rollers or idlers 552 which allow for easy adjustment of the length of the reclosable profile element between points A and B.

Preferably, when a loaded accumulator dancer 567 is used, the accumulator 567 is configured to return to its exact starting position each time before a punch is made in the reclosable profile element and after the reclosable profile element is advanced. In accordance with this preferred embodiment, a sensor means which indicates the starting position of the accumulator dancer is included to control the infeed drive means 566 to insure that whatever length of reclosable profile element 530 is pulled by the jaw-pull device 588 or like means is also matched by the drive means 566 pulling the reclosable profile element 530 through the punch device 550.

Generally the apparatus represented by reference numeral 565 are used because the reclosable profile element 530 is extensible and though a moderate amount of stretch may occur, the apparatus 565 serves to synchronize the reclosable profile element for proper placement of the punch device 550 in the reclosable profile element 530 such that the rectangular ares punched out of the reclosable profile element are incrementally spaced and in register with the cross seals as the packaging film is formed into a package.

Figure 21:
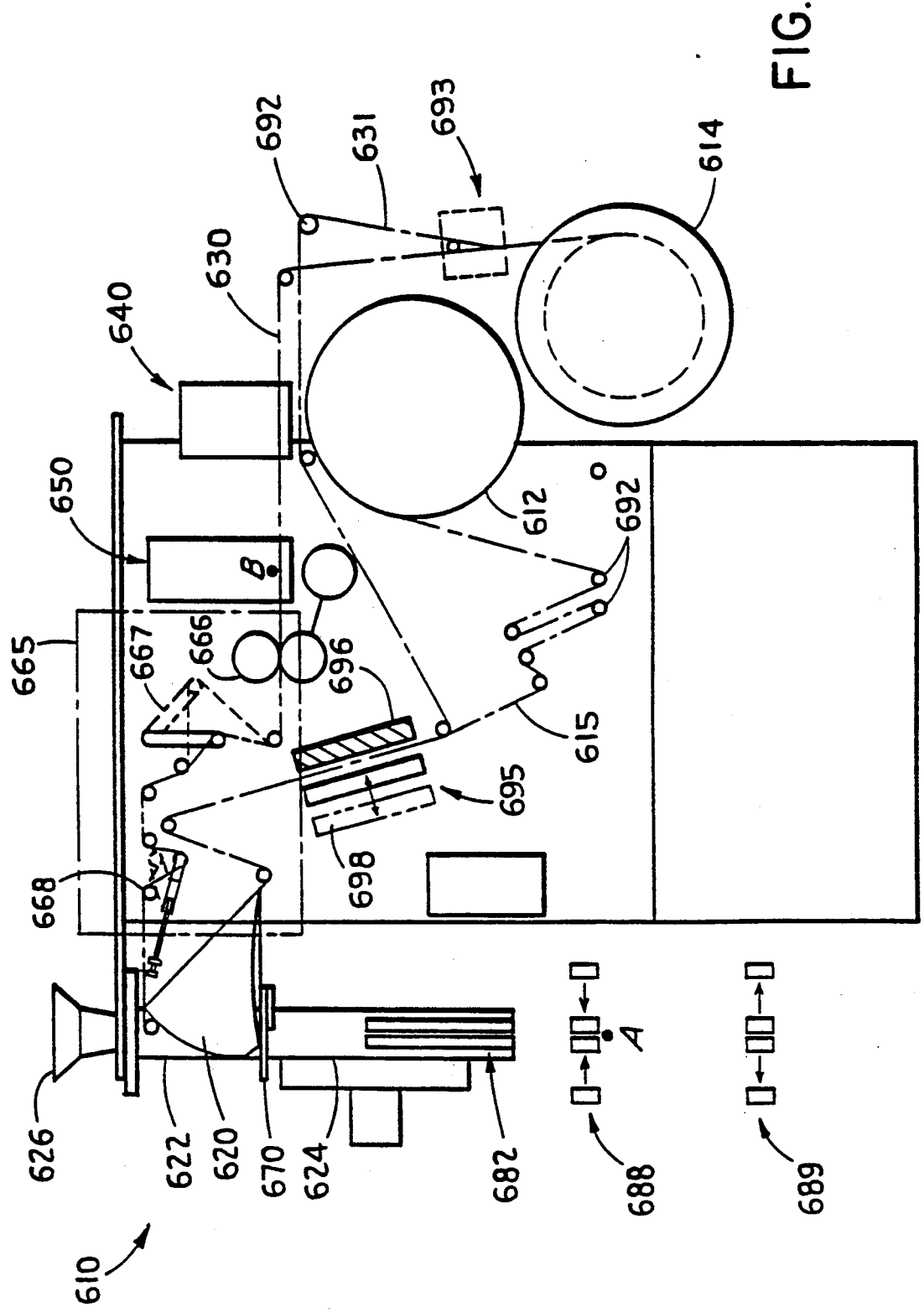
FIG. 21 is a schematic view of another preferred embodiment of the present invention.

Another embodiment of the invention is shown in FIG. 21. Most of the components of the form, fill and seal apparatus illustrated in FIG. 21 are substantially similar to components of the form, fill and seal apparatus illustrated in FIG. 1. The components of the preferred embodiment illustrated in FIG. 21 which are substantially similar to components illustrated in FIG. 1 are denoted with the same reference numeral increased by a factor of 600.

Referring now to FIG. 21, in an alternative preferred embodiment, the tear strip element 631 is adhered to the packaging film 615 prior to forming the packaging film into a tubular form about the form, fill and seal forming tube. In this preferred embodiment, the reclosable profile element 630 includes separable interlocking fastener elements on opposing flanges as illustrated previously in FIG. 8d a tear strip element 631 detachably extruded along at least one of the opposing flanges.

Figures 22, 23:
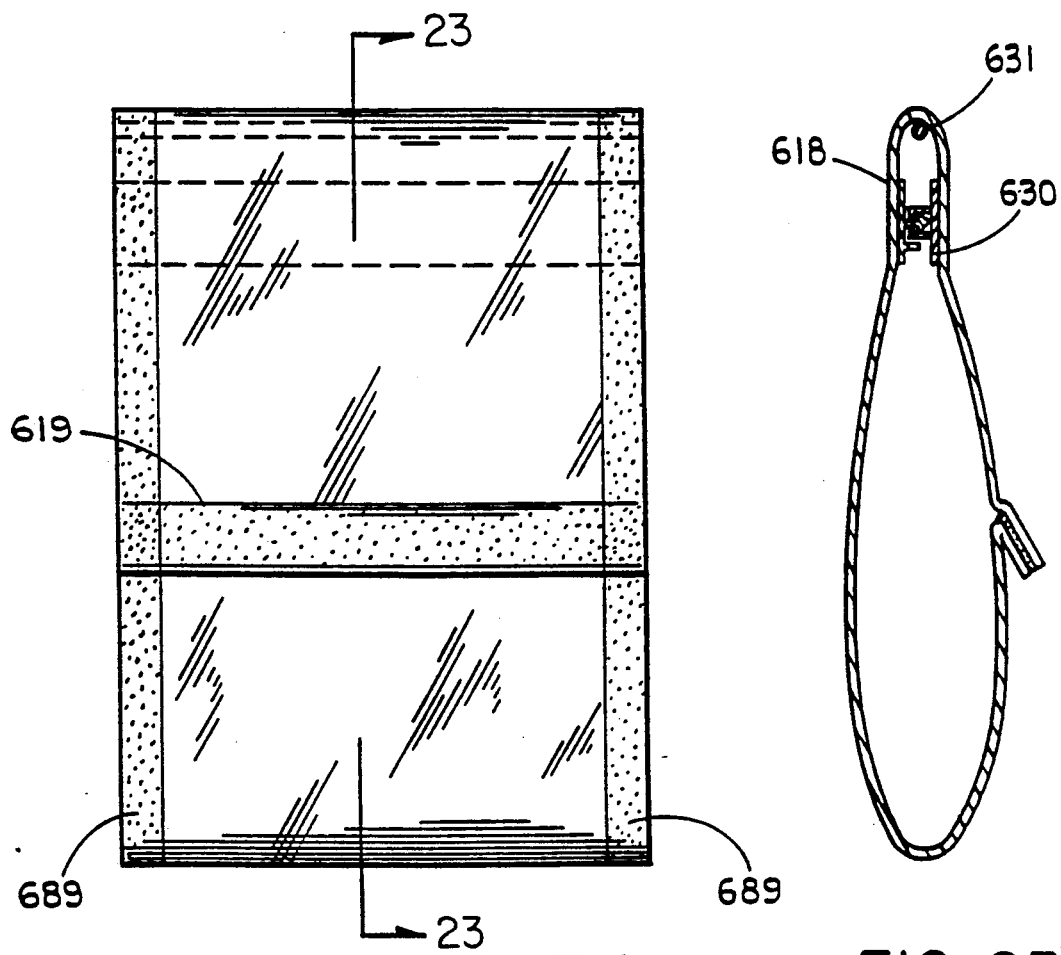
FIG. 22 is a perspective view of a reclosable package made in accordance with a preferred embodiment of the present invention.
FIG. 23 is a cross-sectional view of a reclosable package made in accordance with a preferred embodiment of the present invention taken along line 23—23 of FIG. 22.

In accordance with this preferred embodiment in advance of adhering the tear strip element 631 to the packaging film 615, the tear strip element 631 is severed from the reclosable profile element 630. Preferably a splitting means 693 detaches the tear strip element 631 from the reclosable profile element 630. After the tear strip element 631 is detached from the reclosable profile element 630 the tear strip element 631 is adhered to the web.of packaging film 615 in the manner previously described with respect to FIGS. 19 and 20. The splitting means 693 may be any device, mechanical or otherwise which separates or detaches the tear strip element 631 from the reclosable profile element 630. FIG. 22 illustrates a pillow product filled package having a reclosable profile element 630 and a detachable tear strip element 631 which have been separated prior to forming the packaging film 615 into a reclosable package. FIG. 23 illustrates a cross-sectional view of the pillow product filled package of FIG. 22 wherein the tear strip element 631 is separated from the reclosable profile element 630 and is adhered within the loop of packaging film 618.

In this preferred embodiment and in the previously describe preferred embodiments the tear strip element may be made of a material similar to the reclosable element or may be formed form a material that is different than that of the reclosable element. Preferably the tear strip element is formed of a plastic material having properties which allow the strip to be sealable to the packaging film. Alternatively, if the tear strip is formed of a material having properties which are incompatible with those of the packaging film the strip can be coextruded with a sealant layer or adhesives which permit attachment of the strip to the film.

When packaging with an inert atmosphere is desired, any of the foregoing embodiments may be fitted with gas flush lines as is conventional. In addition, it is preferable to run a gas flush tube along the line of travel of the profile element to terminate in the vicinity of the sealing guide backup. Such a gas flush tube may be formed in a shape to assist in forming the loop of film into which the reclosable profile is threaded.

It should be appreciated that the apparatus and methods of the present invention are capable of being incorporated in the form of a variety of embodiments, only a few of which have been illustrated and described above. The invention may be embodied in other forms without departing from its spirit or essential characteristics. For example, instead of using separate forming and product fill tube, a single tube having a lower section with a reduced diameter, and hence reduced perimeter, could be utilized. The top section would act as a combined forming and fill tube, and as the product traveled down the tube it could be funneled into the smaller diameter section.

For this reason, the described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A reclosable package with a tear strip, said package comprising:
   (a) a pair of opposed walls forming said package, said walls being attached to one another by means of heat seals along opposed edges thereof;
   (b) a reclosable profile element, said reclosable profile element having separable interlocking fasteners on opposing flange elements, each of said flange elements being attached to one of said walls; and
   (c) a tear strip element; wherein said reclosable profile element and said tear strip are extruded as a single unit having a bridge attaching them to one another, said bridge allowing said tear strip element to be easily separated from said reclosable profile element during formation of said package and wherein said tear strip is separated from said reclosable profile element and is not directly attached to either of said walls of said package except in the regions of said heat seals.

2. A reclosable package of claim 1 wherein at least one adhesive strip is co-extruded on said opposing flange elements.

* * * * *